United States Patent [19]

Dupuy

[11] 4,295,250
[45] Oct. 20, 1981

[54] CABLE DEAD ENDING

[76] Inventor: James A. Dupuy, 135 McAuley Dr., Vicksburg, Miss. 39180

[21] Appl. No.: 79,702

[22] Filed: Sep. 28, 1979

[51] Int. Cl.³ .................. F16G 11/02; F16G 11/04
[52] U.S. Cl. ............................. 24/122.6; 403/248; 403/268; 403/275
[58] Field of Search ............... 24/122.6, 136 L, 114.5, 24/122.3; 403/275, 268, 248, 251, 215, 216, 265; 174/79; 405/260, 261

[56] References Cited

U.S. PATENT DOCUMENTS

| | | |
|---|---|---|
| 2,898,655 | 8/1959 | Buskirk . |
| 3,220,074 | 4/1965 | Ehmann . |
| 3,254,383 | 6/1966 | Ehmann . |
| 3,475,795 | 11/1969 | Youngblood . |
| 3,570,074 | 3/1971 | Schimmeyer et al. ............. 24/122.6 |
| 3,600,765 | 12/1971 | Rovinsky . |
| 4,126,498 | 4/1978 | Donecker . |

FOREIGN PATENT DOCUMENTS 660357  2/1964  Italy .................................. 403/216

OTHER PUBLICATIONS

Esco Catalog No. 284, 1970.
Socketfast Brochure, "Procedure for Resin System Socketing of Wire Rope", 1977.

*Primary Examiner*—Roy D. Frazier
*Assistant Examiner*—Alexander Grosz
*Attorney, Agent, or Firm*—Cushman, Darby & Cushman

[57] ABSTRACT

A cable dead end, and method of dead end formation, that can be readily utilized in the field with a minimum of equipment and components, yet providing a durable, tight, dead end. The cable end is cut off and a ferrule is slipped over the cable end onto the cable. The strands at the end of the cable are unwound and separated, an insert is disposed over the core strand and is disposed within a general bird-cage configuration of the cable strands at the cable end. The ferrule is then moved over the bird-cage configuration and to the end of the cable, and the void space inside the ferrule between the strands, ferrule, and insert is packed with steel wool. Then an anerobic, structural, single component adhesive (e.g. an oxygenated methacrylic) is poured into the ferrule interior volume, and quickly cures. Preferably the insert is barbed, and the interior cross-section of the ferrule is elliptical.

5 Claims, 6 Drawing Figures

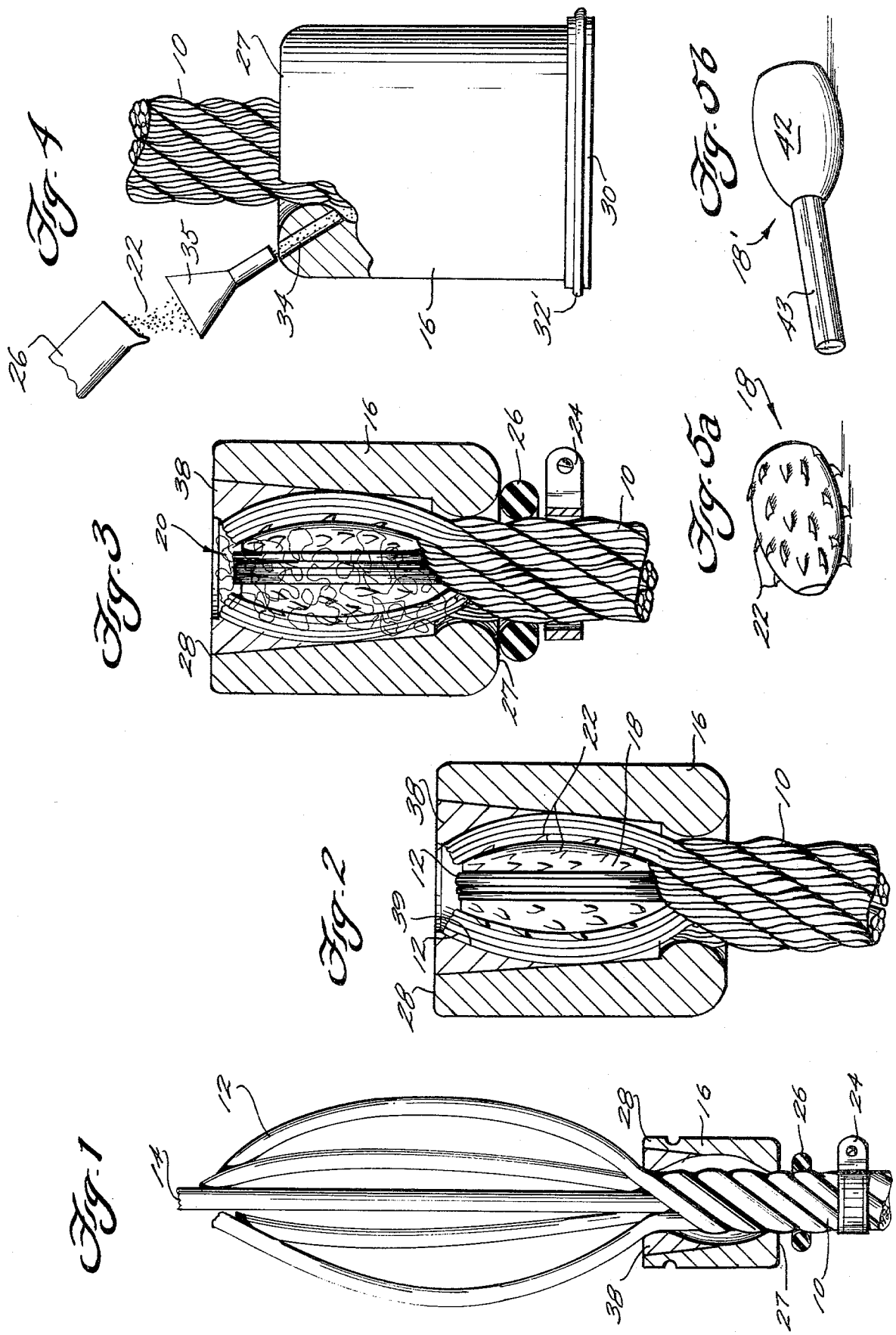

CABLE DEAD ENDING

BACKGROUND AND SUMMARY OF THE INVENTION

Three different systems for forming cable dead-ends are commonly in use today in the art. These are a molten metal system, the resin system, and a wedge type ferrule system.

In the molten metal system, the cable end is cleaned with three different solutions to remove grease and oil, etch the wire, and neutralize the etching acid. Then the wire end is broomed out, a suitable metal (babbit or zinc) is heated over an open flame, and the molten metal is poured on the broomed end and allowed to cool to provide the finished product. In the resin system, a wire seizing is disposed on the cable a predetermined distance from the cable end, the cable end is cleaned, care being taken to insure that a solvent that is compatible with the resin to be used is employed, the end is broomed, a socket disposed therearound, and the broomed strands in the socket interior filled with resin, with a final cure taking approximately sixteen hours at room temperature, and care being taken to see that the method is not practiced when the socket temperature is below 65° F. or above 100° F. In the wedge type ferrule system, a ferrule is slipped over the cable, the strands are unwound, an insert is disposed over the cable core strand, the strands are rewound around the core, and the wedge is hammered into place in the ferrule so that a tight interference fit is provided between the wedge, strands, and ferrule.

While each of the above systems can be utilized to provide an acceptable cable dead end, they have one or more of the following problems associated therewith: The use of multiple solvents, or a restricted number of solvents may be utilized. The requirement for cable brooming. The utilization of an open flame, which in some work places is dangerous and/or inconvenient. Excessive loosening when the load is released. Excessive susceptibility to corrosion. The necessity for long curing times, or special curing equipment.

According to the present invention a method of forming a cable dead end is provided which overcomes essentially all of the above mentioned disadvantages associated with conventional prior art arrangements. According to the present method, a cleanly cut cable end is provided, a ferrule is slipped over the cable end onto the cable, and the cable strands are unwound and separated (a screwdriver may be utilized to accomplish this) over a length of the cable from the cable end to the ferrule, and the strands of the cable are disposed in a general bird-cage configuration. Then an insert (preferably barbed) is slipped over the core strand disposed within the bird-cage configuration, and the ferrule is also moved over the bird-cage configuration into the end of the cable. Then the void space inside the ferrule, between the strands, ferrule, and insert, is packed with a metallic void-filling material, preferably steel wool. Then the cable strands, insert, and metallic void-filling material inside the ferrule are saturated with an anerobic, structural, single component adhesive that can fast-cure at room temperature.

The ends of the ferrule may be sealed, as with a rubber cap, O-ring, hose clamp, and the like. During saturation of the interior of the ferrule, the open end of the ferrule may be sealed, the cable inverted, and the adhesive poured through a bore in the ferrule, so that leakage of adhesive from the ferrule is minimized.

According to the present invention, a cable dead end of a steel multi-strand cable (including a core strand) is provided. The dead end comprises a ferrule having an elliptical interior cross-section, and an insert disposed around the cable core strand with the other cable strands disposed around the insert in a bird-cage configuration, and with the insert substantially centered in the ferrule interior. The insert also may be generally elliptical in cross-section with barbs on the exterior surface thereof, and the ferrule is packed with steel wool, and the interior is saturated with an anerobic, structural, single component adhesive.

It is the primary object of the present invention to provide an improved method for forming a steel cable dead end, and an improved resulting cable dead end. This and other objects of the invention will become clear from an inspection of the detailed description of the invention, and from the appended claims.

BRIEF DESCRIPTION OF THE DRAWINGS

FIG. 1 is a side view, partly in cross-section and partly in elevation, of a cable end and ferrule in one stage of practicing the method according to the present invention;

FIG. 2 is a side view, partly in cross-section and partly in elevation, of the structures of FIG. 1 at another stage in practicing the method according to the invention;

FIG. 3 is another view like FIG. 2 only showing the structure at still a further stage in practicing the method of the invention;

FIG. 4 is a side view illustrating one way in which the structures interior of the ferrule may be saturated with adhesive in practicing the inventive method; and FIGS. 5a and 5b are perspective views of two different embodiments of inserts that may be utilized in forming a cable dead end according to the invention.

DETAILED DESCRIPTION OF THE DRAWINGS

A sequence of steps for practicing the method of forming a cable dead end of a multi-strand steel cable, including a core strand, is illustrated in FIGS. 1 through 4. The basic components for practicing the method include the cable 10 having a plurality (e.g. seven) strands including outer strands 12 in a core strand 14; a ferrule 16; and insert 18, 18' adapted to be disposed over the core strand 14; a metallic void-filling material, such as steel wool, illustrated generally at 20 in FIG. 3; and an anerobic, structural, adhesive 22 (see FIG. 4), preferably a single component adhesive.

In practicing the method according to the invention, a cleanly cut cable end is provided, as by cutting off the cable end with a guillotine type cable cutter. Preferably a petroleum cleaner or solvent is then used to remove the oil or grease from the cable end, and a wide variety of solvents may be utilized for accomplishing this purpose. Then the ferrule 16 is slipped over the cable end onto the cable 10, and the strands 12, 14 are unwound and separated over a length of the cable (e.g. about 10 inches) between the ferrule and the cable end, and the strands are disposed in a generally bird-cage configuration. Such unwinding and separating may be accomplished utilizing a hand metal-shaft tool, such as a screwdriver, Marlin spike, or the like. The relative positions of the structures at this stage of practicing the method are illustrated in FIG. 1, the ferrule 16 being shown in cross-section.

The next step in practicing the method according to the invention is to slip the insert 18 (or 18') over the core strand 14, and dispose it within the bird-cage configuration formed by the strands 12. Then the ferrule is moved over the bird-cage configuration and to the end of the cable to the position illustrated in FIG. 2. This may be accomplished by utilizing the ferrule 16 as a hammer to impact the bird-cage configuration of the strands 12, surrounding the insert 18, until the ferrule 16 is moved up to the end of the cable. By placing the insert 18 originally at a significant distance from the end of the cable and impacting the strands 12 surrounding the insert 18 in this manner, the strands automatically plait themselves back together.

After the components are moved to the relative position illustrated in FIG. 2, the interior of the ferrule (the volume between the ferrule interior, insert 18, and strands 12, 14) is packed with the metallic void-filling material 20 as illustrated in FIG. 3. Preferably, the metallic void-filling material is fibrous, steel wool being the preferred material. Where the insert 18 with barbs 22 formed on the exterior surface thereof is utilized, the steel wool 20 becomes entangled in the barbs 22, and facilitates pulling the insert 18 into a locking taper of the ferrule 16 thus restricting cable movement. After the interior of the ferrule 16 is packed with the steel wool 20, it is ready to receive the adhesive.

Before pouring the adhesive into the ferrule interior, however, it is desirable to provide a seal at one end of the ferrule 16 so that the adhesive cannot freely leak out of the ferrule. One way this may be accomplished is illustrated in FIGS. 1 and 3, wherein a conventional hose clamp 24 and O-ring 26 are placed over the cable 10 before the ferrule 16 is slipped thereover, and once the ferrule has been packed with steel wool, the O-ring 26 is moved up into abutting engagement with the end 27 of the ferrule 16, and it is held in this position by tightening the hose clamp 24 in abutting relationship with the O-ring 26. If desired, the O-ring 26, ferrule end 27, and hose clamp 24 may also be closed with a duct sealing putty or the like, to enhance the sealing effect. Once the end 27 has been properly sealed, the adhesive is merely poured through the open portion of the end 28 of ferrule 16.

Another way that the ferrule 16 can be sealed before introduction of the adhesive is by applying a cap 30 of flexible material (e.g. rubber) over the ferrule end 28, and holding the cap in place with an O-ring 32' or the like. Then the cable end is inverted, as illustrated in FIG. 4, and the adhesive 22 is poured through a bore 34 extending from the cable end 27 to the interior thereof. A funnel 35 may be utilized to facilitate such a pouring where the pouring is from a container 36 or the like. The end 28 of the ferrule 16 also could be stopped up in other manners before pouring with the adhesive, as by utilizing a disk (perhaps a penny). Also, a cap 30 or the like may be placed over the end 28 of the ferrule 16 after pouring is effected through the open portion of ferrule end 28, and an O-ring 26, hose clamp 24, or the like may be utilized with the cable 10 and ferrule 16 even if the pouring method illustrated in FIG. 4 is utilized.

The ferrule 16 according to the present invention preferably has an elliptical interior cross-section, as illustrated in FIGS. 1 through 3. This elliptical cross-section can be the original shape of the ferrule 16 interior, and the ferrule interior would then be so dimensioned with respect to the insert 18 and the cable strands 12, so that the narrowest diameter of the ferrule interior (at the opening at ferrule end 28) was slightly greater than the combined maximum diameter of the insert 18 and the sum of the diameters of the cable strands 12. Alternatively, the elliptical cross-section of the ferrule interior could be achieved by utilizing a metal ring 38 having a conically shaped inner surface 39, the ring 38 being driven into an interference fit with the interior of the ferrule 16 at end 28 thereof once the ferrule 16 had been moved to the end of the cable 10, with the strands 12, 14 and insert 18 received therewithin. In such a situation, the opening in the ring 38 could be dimensioned so that it had a diameter less than the sum of the diameters of the strands 12 and the maximum diameter of the insert 18.

Preferably, the insert 18 is elliptical in shape, as illustrated in FIG. 5a, with barbs 22 extending from the exterior surface thereof. However the insert could also take a variety of other configurations, such as that illustrated at 18' in FIG. 5b. The insert 18' comprises a generally hollow elliptical body 42 with a tube 43 running through the body 42 and extending outwardly from one end thereof. Once the insert is around the center strand 14, and the ferrule 16 is in place at the cable end (generally as illustrated in FIG. 2), the tube 43 is deformed (crimped) around the center strand 14.

The adhesive 22 preferably is a single component, anerobic, structural adhesive, preferably one that can fast-cure at room temperature. Exemplary adhesives having such characteristics are oxgenated methacrylics and cyanoacrylics. Such adhesives are conventionally sold under the trademark LOCTITE. Suitable two-component adhesives may also be practical.

The formation of a cable dead end according to the present invention does not require a plurality of cleaning liquids to be utilized, eliminates any use of an open flame, provides an extremely tight formation that will not loosen under normal circumstances, will cure quickly at room temperature, and can be practiced without employing any complicated or expensive equipment. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A cable dead end of steel multistrand cable including a core strand, comprising:
    a ferrule having an elliptical interior cross section;
    an insert disposed around the cable core strand with the other cable strands disposed around the insert in a bird-cage configuration, and with the insert substantially centered in the ferrule interior, said ferrule being generally elliptical in cross section and having barbs on the exterior surface thereof; and
    steel wool packing the ferrule interior between it, the strands, and said insert.

2. A cable dead end as recited in claim 1 further comprising an anerobic, structural, single component adhesive saturating the entire interior volume of the ferrule.

3. A cable dead end of a multi-strand cable including a core strand, comprising
    a ferrule;

an insert disposed around the cable core strand with the other cable strands disposed around the insert in a bird-cage configuration, and with the insert centered in the ferrule interior;

a metallic void-filling material packing the ferrule interior between it, the strands, and insert; and an anerobic, structural, adhesive saturating the entire interior volume of the ferrule.

4. A cable dead end as recited in claim 3 wherein the adhesive is a single component fastcuring oxygenated methacrylic adhesive.

5. A cable dead end as recited in claim 3 wherein the insert has an elongated tubular member extending from one end of a tubular passageway therethrough, said tubular member being crimped around the cable core strand.

* * * * *